(12) United States Patent
Fernández

(10) Patent No.: US 7,536,886 B2
(45) Date of Patent: May 26, 2009

(54) NON-LINEAR STEERING LOCK ASSEMBLY

(75) Inventor: Juan A. Fernández, Brown Deer, WI (US)

(73) Assignee: Huf North America Automotive Parts Mfg. Corp., Milwaukee, WI (US)

( * ) Notice: Subject to any disclaimer, the term of this patent is extended or adjusted under 35 U.S.C. 154(b) by 0 days.

(21) Appl. No.: 12/192,733

(22) Filed: Aug. 15, 2008

(65) Prior Publication Data

US 2008/0302147 A1    Dec. 11, 2008

Related U.S. Application Data

(63) Continuation of application No. 11/257,695, filed on Oct. 25, 2005, now Pat. No. 7,475,576.

(60) Provisional application No. 60/622,128, filed on Oct. 26, 2004.

(51) Int. Cl.
 *B60R 25/02* (2006.01)
(52) U.S. Cl. .................. 70/186; 70/252; 70/379 R
(58) Field of Classification Search ........... 70/182–186, 70/252, DIG. 30, 379 R, 379 A, 256, 396, 70/399; 292/140, 159; 280/775
See application file for complete search history.

(56) References Cited

U.S. PATENT DOCUMENTS

| | | | | |
|---|---|---|---|---|
| 1,617,985 A | * | 2/1927 | Bishop | 70/237 |
| 1,788,473 A | * | 1/1931 | Smith | 70/170 |
| 2,119,456 A | * | 5/1938 | Dies | 70/129 |
| 2,295,723 A | * | 9/1942 | Duncan | 70/186 |
| 3,604,231 A | * | 9/1971 | Buschi | 70/496 |
| 4,798,067 A | * | 1/1989 | Peitsmeier et al. | 70/252 |
| 5,086,632 A | * | 2/1992 | Hsu | 70/375 |
| 5,570,599 A | * | 11/1996 | Konii | 70/186 |
| 5,887,463 A | * | 3/1999 | Bobbitt, III | 70/182 |
| 5,894,749 A | * | 4/1999 | Tomaszewski et al. | 70/240 |
| 6,779,371 B1 | * | 8/2004 | Pieper | 70/186 |
| 6,957,556 B1 | * | 10/2005 | Ha | 70/491 |
| 7,475,576 B2 | * | 1/2009 | Fernandez | 70/186 |

FOREIGN PATENT DOCUMENTS

| | | | |
|---|---|---|---|
| DE | 3443712 | * | 6/1986 |
| GB | 2261992 | * | 6/1993 |
| WO | WO 2005/080152 | * | 9/2005 |

* cited by examiner

*Primary Examiner*—Lloyd A Gall
(74) *Attorney, Agent, or Firm*—Quarles & Brady LLP

(57) ABSTRACT

A steering lock assembly an assembly housing includes a non-linear passage that receives a cam shaft and/or cam pin. The non-linear passage provides a steering lock assembly that is shorter than steering lock assemblies having an assembly housing with a linear passage for receiving the cam shaft and cam pin.

18 Claims, 3 Drawing Sheets

NON-LINEAR STEERING LOCK ASSEMBLY

CROSS REFERENCES TO RELATED APPLICATIONS

This application claims the priority benefit of U.S. patent application Ser. No. 11/257,695, filed on Oct. 25, 2005, U.S. Pat. No. 7,475,576, and U.S Provisional Patent Application No. 60/622,128, filed on Oct. 26, 2004.

STATEMENT REGARDING FEDERALLY SPONSORED RESEARCH

Not Applicable.

BACKGROUND OF THE INVENTION

This invention relates to a steering lock module, and in particular an automotive steering lock assembly including a cam shaft and/or cam pin.

An automotive steering column houses a steering shaft that upon rotation changes the angular direction of vehicle wheels to steer the vehicle. A steering lock assembly mounted in the steering column includes a lock bolt engageable with the steering shaft to prevent rotation of the steering shaft, and thus the ability to steer the vehicle. A key inserted into the steering lock assembly is rotated to disengage the lock bolt from the steering shaft and start the vehicle engine.

As the key is inserted into the steering lock assembly and/or the lock cylinder is rotated, the lock cylinder urges a cam pin into engagement with a switch that indicates the key has been properly inserted into the steering lock assembly. Upon rotation of the key in the lock cylinder, the lock bolt is urged out of engagement with the steering shaft by a cam shaft coupled to a lock cylinder, and the cam shaft is engaged with an ignition switch which upon rotation of the cam shaft by the lock cylinder starts the vehicle engine. In some embodiments, the switch engaging the cam pin is the ignition switch that starts the vehicle engine.

A steering lock assembly housing houses the lock bolt, cam shaft, cam pin, and lock cylinder. Known steering lock assembly housings define a linear passageway through which the linear cam shaft and cam pin extend. This linear passageway, cam shaft, and cam pin define in part the shape, and thus the size, of the housing. Unfortunately, the space available in the steering column for mounting the steering lock assembly is limited. Moreover, the angle at which the key must be inserted into the steering lock assembly is limited to the axis of the linear passageway. Accordingly, a need exists for a steering lock assembly having a shape and/or size that can fit in the space available in a steering column and provide more options as to the angle of key insertion into the steering lock assembly.

SUMMARY OF THE INVENTION

The present invention provides a steering lock assembly including an assembly housing defining a non-linear passage that receives a non-linear cam shaft and/or cam pin. The non-linear passage provides a steering lock assembly that is shorter than steering lock assemblies having an assembly housing with a linear passage for receiving the cam shaft and cam pin. In one embodiment, the cam shaft passing through the non-linear passage is articulated to accommodate the non-linear passage. In another embodiment, the cam pin is flexible to accommodate the non-linear passage.

A general objective of the present invention is to provide a steering lock assembly that requires a small space in a steering column and allows for a greater range of key insertion angles. This objective is accomplished by providing a steering lock assembly having a housing defining a non-linear passage for a cam shaft and cam pin to reduce the length of the steering lock assembly compared to a steering lock assembly having a linear passage for the cam shaft and cam pin.

Another objective of the present invention is to provide a cam shaft that can pass through a non-linear passage formed in an assembly housing. This objective is accomplished in one embodiment by providing an articulated cam shaft.

Another objective of the present invention is to provide a cam pin that can pass through a non-linear passage formed in an assembly housing. This objective is accomplished in one embodiment by providing a cam pin having a flexible portion that passes through the non-linear portion of the passage.

The foregoing and other objects and advantages of the invention will appear from the following description. In the description, reference is made to the accompanying drawings which form a part hereof, and in which there is shown by way of illustration a preferred embodiment of the invention.

Figure 1:
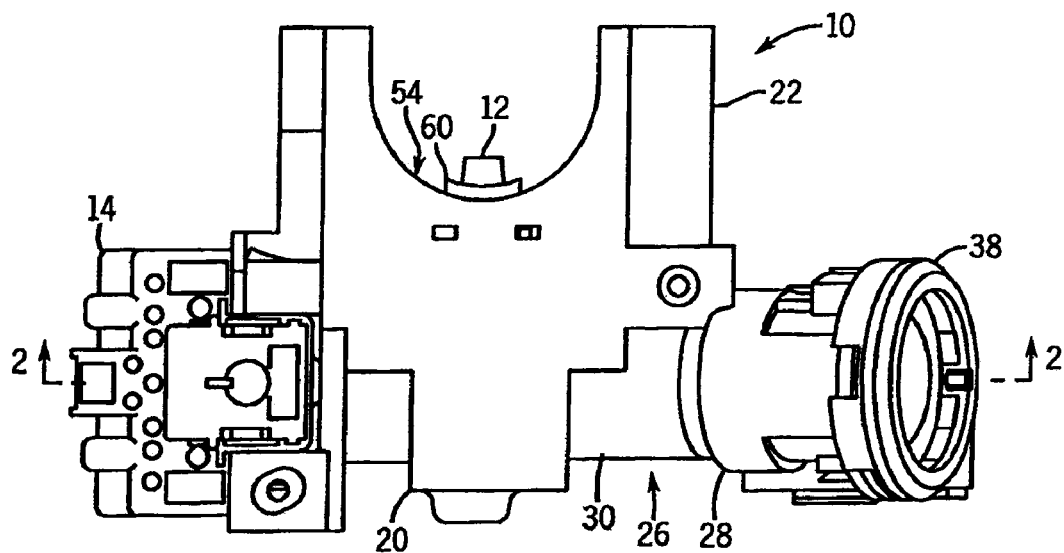
FIG. 1 is a side view of a steering lock assembly incorporating the present invention.

Before a preferred embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 2:
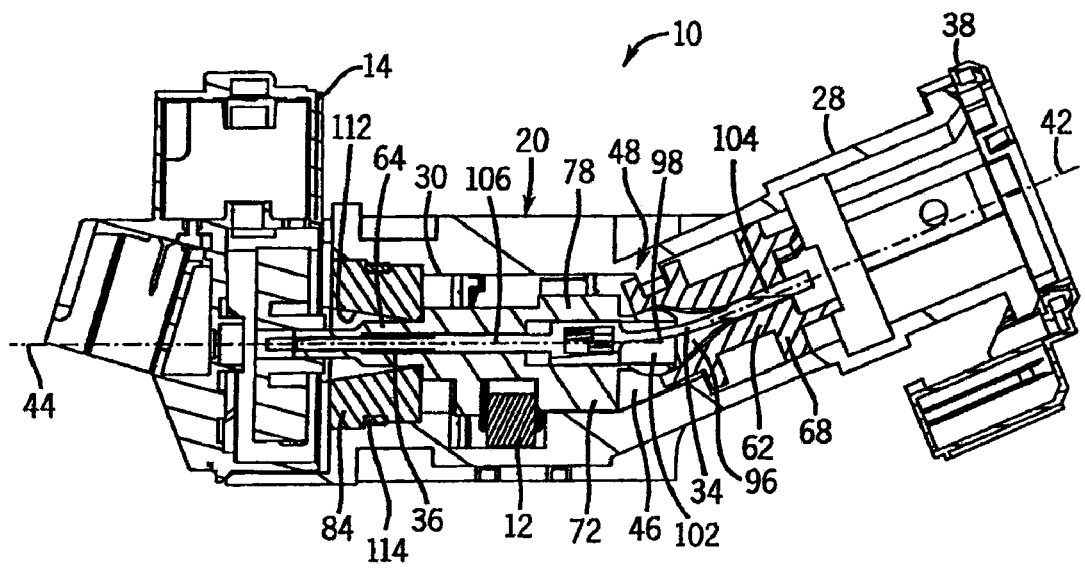
FIG. 2 is a cross sectional view of the steering lock assembly along line 2-2 of FIG. 1.
Figure 3:
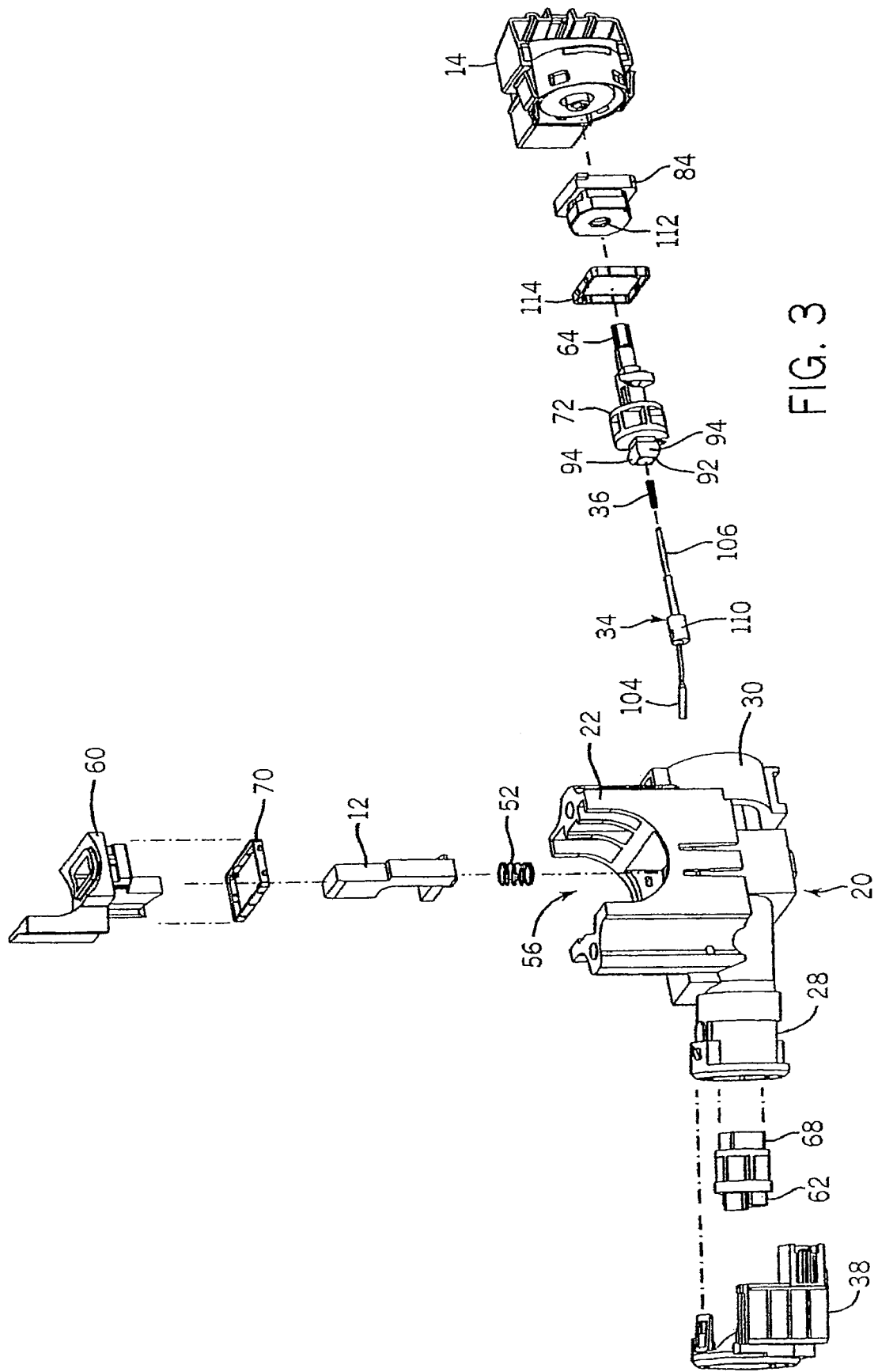
FIG. 3 is a perspective, exploded view of the steering lock assembly of FIG. 1.

As shown in FIGS. 1-3, a steering lock assembly 10 suitable for mounting in a steering column of a vehicle includes a lock bolt 12 that is engageable with a steering shaft. Upon rotation, the steering shaft changes the angular direction of vehicle wheels to steer the vehicle. The lock bolt 12 selectively engages the steering shaft to prevent rotation of the steering shaft, and thus the ability to steer the vehicle. Preferably, a cylinder lock assembly actuable by a key actuates the steering lock assembly 10 to selectively engage the lock bolt 12 with the steering shaft. In the embodiment disclosed herein, an ignition switch 14 forming part of the steering lock assembly 10 is actuated to start the vehicle when the lock bolt 12 is disengaged from the steering shaft.

The steering lock assembly 10 includes an assembly housing 20 having a lock bolt portion 22 extending from a cylindrical portion 26. The cylindrical portion 26 extends between a cylindrical forward end 28 and a cylindrical rearward end 30. The cylindrical forward end 28 extends along a first longitudinal axis 42 toward the lock bolt portion 22. The cylindrical rearward end 30 extends along a second longitudinal axis 44 past the lock bolt portion 22. The first longitudinal axis 42 defines an angle with the second longitudinal axis 44 to shorten the overall length of the assembly housing 20 compared to a housing having coaxial forward and rearward ends. The forward and rearward ends 28, 30 of the assembly housing 20 define a non-linear passageway 46 through the assembly housing 20 having a non-linear section 48 at the junction of the forward and rearward ends 28, 30.

The assembly housing 20 is preferably formed as a single piece with the lock bolt portion 22 and cylindrical portion 26 formed from a metal, such as a zinc die cast alloy, aluminum, and the like. Although a housing 20 formed as a single piece is preferred, the assembly housing 20 can be formed from, a plurality of portions that are joined together using methods known in the art, such as welding, bolting, and the like, without departing from the scope of the invention. Moreover, although the present invention is especially suitable for a housing 20 formed from a non-resilient material, such as a metal, the assembly housing 20 can be formed from any material, such as plastic, ceramic, and the like without departing from the scope of the invention.

The lock bolt portion 22 of the assembly housing 20 reciprocally houses the lock bolt 12, and includes a concave upper surface 54 that receives the vehicle steering shaft. A cavity 56 formed in the lock bolt portion 22 intersects the passageway 46 of the assembly housing 20 and opens to the upper surface 54. The cavity 56 receives the lock bolt 12 and a lock bolt spring 52, and is covered by a lock bolt cover 60. The lock bolt spring 52 biases the lock bolt 12 into engagement with the steering shaft. The lock bolt cover 60 is fixed relative to the assembly housing 20 by a snap belt 70, and limits movement of the lock bolt 12 out of the cavity 56.

An antennae housing 38 mounted to the cylindrical forward end 28 of the assembly housing 20 receives the cylinder lock assembly. The cylinder lock assembly can be any cylinder lock assembly known in the art engageable with a cam shaft 32 and cam pin 34 forming part of the steering lock assembly 10. In the embodiment disclosed herein, the cylinder lock assembly receives a key, and upon rotation of the key urges the cam pin 34 rearwardly into engagement with the ignition switch 14 mounted to the rearward end 30 of the assembly housing 20 and rotates the rotatable cam shaft 32 to disengage the lock bolt 12 from the steering shaft.

The rotatable cam shaft 32 is disposed in the cylindrical portion 26 of the assembly housing 20 through the cylindrical forward end 28 and passes through the non-linear passageway 46. The cam shaft 32 includes a proximal end 62 and a distal end 64. The proximal end 62 extends substantially parallel to the first longitudinal axis 42 and engages the lock cylinder received in an antennae housing 38 mounted to the cylindrical forward end 28 of the assembly housing 20. The distal end 64 of the cam shaft 32 extends substantially parallel to the second longitudinal axis 44 and past the lock bolt portion 22. A cam surface 66 formed on the distal end 64 of the cam shaft 32 engages the lock bolt 12 mounted in the lock bolt portion 22 for reciprocal movement orthogonal to the second longitudinal axis 44 of the cylindrical rearward end 30.

Figure 4:
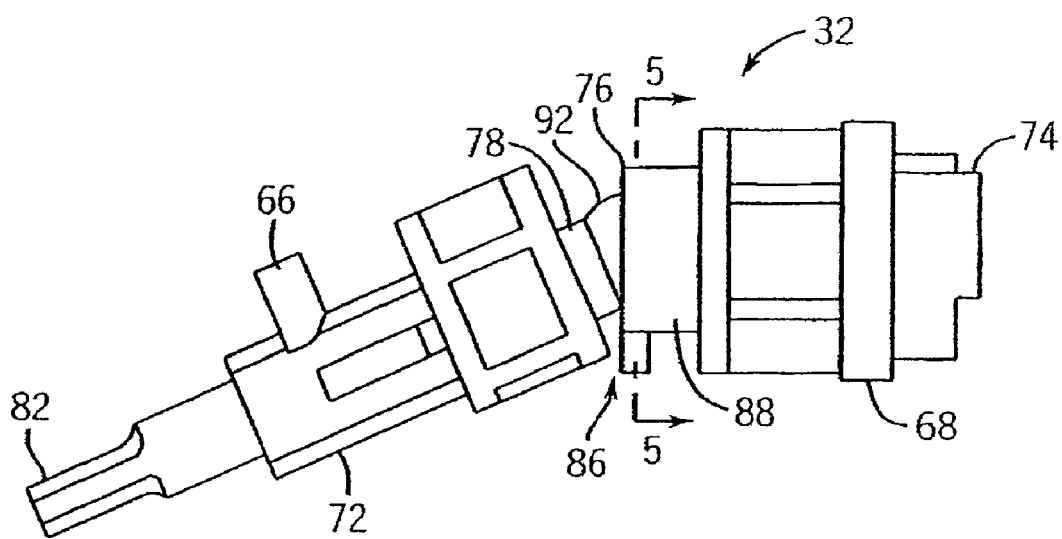
FIG. 4 is a perspective view of the cam shaft of FIG. 3.

As shown in FIGS. 3 and 4, preferably, the cam shaft 32 is an assembly including a forward shaft 68 coupled to a rearward shaft 72. The forward shaft 68 is received in the cylindrical forward end 28, and extends substantially parallel to the first longitudinal axis 42 from a proximal end 74 to a distal end 76. The proximal end 74 of the forward shaft 68 corresponds to the proximal end 62 of the cam shaft 32. The rearward shaft 72 is received in the cylindrical rearward end 30 of the assembly housing 20, and extends substantially parallel to the second longitudinal axis 44 past the lock bolt portion 22 of the assembly housing 20. The cam surface 66 is formed on the rearward shaft 72 between a proximal end 78 and a distal end 82 of the rearward shaft 72. The distal end 82 of the rearward shaft 72 corresponds to the distal end 64 of the cam shaft 32, and is supported by an end cover 84 received in the cylindrical rearward end 30 of the assembly housing 20.

The forward shaft distal end 76 is rotatably coupled to the proximal end 78 of the rearward shaft 72 by a ball and socket joint 86 that allows the cam shaft 32 to pass through the non-linear section 48 of the non-linear passageway 46 formed through the assembly housing 20. The ball and socket joint 86 includes a socket 88 formed on the distal end 76 of the forward shaft 68 that receives a ball 92 formed on the proximal end 78 of the rearward shaft 72. The ball 92 has rounded sides 94 in the direction of the second longitudinal axis 44 that allows the ball 92 to pivot relative to the socket 88 as the cam shaft 32 rotates in the passageway 46 formed in the assembly housing 20. Of course, the ball 92 can be formed on the distal end 76 of the forward shaft 68 which is received in a socket 88 formed on the proximal end 78 of the rearward shaft 72 without departing from the scope of the invention.

Figure 5:
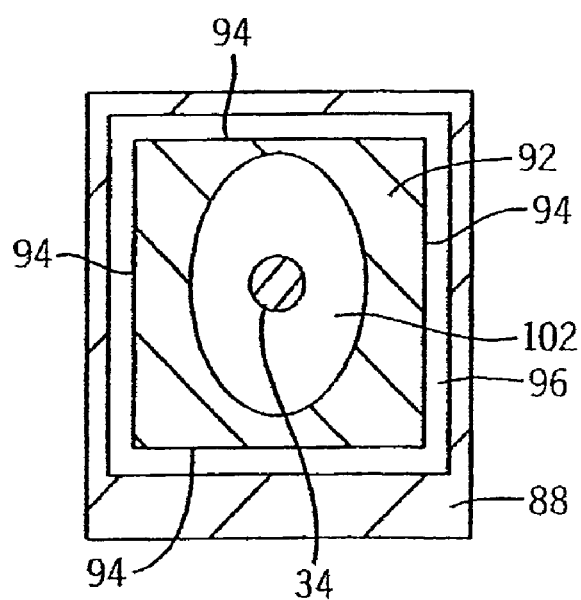
FIG. 5 is a cross sectional view of the cam shaft along line 5-5.

As shown in FIGS. 3-5 the socket 88 defines a cavity 96 having a non-circular cross section that receives the complementary non-circular cross section shaped ball 92 formed on the proximal end 78 of the rearward shaft 72. Advantageously, the non-circular cross section of the ball 92 and socket 88 ensure that the forward and rearward shafts 68, 72 rotate together to actuate the lock bolt 12. Although a ball 92 and socket 88 having complementary polygonal cross sections in the form of a square is shown, the ball 92 and socket 88 can have any non-circular cross sectional shape, such as a polygon, circle with a key or teeth, and the like, that ensures both forward and rearward shafts 68, 72 rotate together, without departing from the scope of the invention. Moreover, although an articulated cam shaft 32 is preferred, any cam shaft or cam shaft assembly that can pass through a non-linear section of a non-linear passageway, such as a single flexible shaft cam shaft, two or more shafts coupled end to end by universal joints, and the like, can be used without departing from the scope of the invention.

The ball and socket joint 86 rotates about a point 98 defined by the intersection of the first and second longitudinal axes 42, 44. Preferably, the first and second longitudinal axes 42, 44 intersect at a point within the ball and socket joint 86 to minimize the space required for the cam shaft 32 to rotate within the assembly housing 20. Of course, the first and second longitudinal axes 42, 44 can intersect at a point outside of the ball and socket joint 86 with the assembly housing 20 sized to accommodate the additional space required for the cam shaft 32 to rotate in the non-linear passageway 46 formed through the assembly housing 20 without departing from the scope of the invention.

An inner passageway 102 formed through the cam shaft 32 between the cam shaft ends 62, 64 receives the cam pin 34 that moves longitudinally through the cam shaft 32 to engage the ignition switch 14. The cam pin 34 includes a proximal end 104 and a distal end 106, and is longitudinally biased by a cam spring 36 received in the inner passageway 102. The proximal end 104 of the cam pin 34 engages the cylinder lock assembly and the distal end 106 of the cam pin 34 engages the ignition switch 14. Preferably, the cam pin 34 is formed from a resilient material, such as acetal, that bends to allow the cam pin 34 to pass through the non-linear section 48 of the non-linear passageway 46. However, any resilient material can be used without departing from the scope of the invention.

As shown in FIGS. 2 and 3 in a preferred embodiment, the cam pin 34 is a molded single piece. The distal end 106 of the cam pin 34 is substantially rigid and extends through a portion of the inner passageway 102 formed through the rearward shaft 72. The proximal end 104 of the cam pin 34 is flexible and extends through a portion of the inner passageway 102 formed through the ball and socket joint 86 and the forward shaft 68. The proximal and distal ends 104, 106 are joined by a plug 110 disposed in an enlarged portion of the inner passageway 102 formed in the proximal end 78 of the rearward shaft 72. Preferably, the distal end 106 of the cam pin 34 is joined to the plug 110 offset from the plug longitudinal center axis which is coaxial with the second longitudinal axis 44 to minimize the bending required of the distal end 106 to pass through the ball and socket joint 86. Of course, the pin can be formed from more than one piece without departing from the scope of the invention.

The end cover 84 is received in the cylindrical rearward end 30 of the assembly housing 20, and is fixed relative to the assembly housing 20 by a snap belt 114. An aperture 112 formed through the end cover 84 receives the distal end 64 of the cam shaft 32 to support the cam shaft distal end 64. The ignition switch 14 is mounted to the end cover 84 to fix the ignition switch 14 relative to the assembly housing 20 and align the ignition switch 14 with the cam pin 34 which engages the ignition switch 14 through the aperture 112.

In use, a user inserts a key into the cylinder lock assembly. Rotation of the key in the cylinder lock assembly rotates the articulated cam shaft 32 to retract the lock bolt 12 from the steering shaft and actuate the ignition switch 14. Simultaneously, the cylinder lock assembly longitudinally moves the cam pin 34 to actuate the switch 14. Advantageously, forming the cylindrical forward end 28 of the assembly housing 20 at an angle relative to the cylindrical rearward end 30 reduces the space required in the steering column to mount the steering lock assembly 10 and allows more ergonomical options, such as a range of key insertion angles.

While there has been shown and described what are at present considered the preferred embodiment of the invention, it will be obvious to those skilled in the art that various changes and modifications can be made therein without departing from the scope of the invention defined by the appended claims. Therefore, various alternatives and embodiments are contemplated as being within the scope of the following claims particularly pointing out and distinctly claiming the subject matter regarded as the invention.

I claim:

1. A steering lock assembly comprising:
   a housing defining a non-linear passage;
   a lock bolt disposed in a cavity formed in said housing and intersecting said non-linear passage, said lock bolt being movable between a lock position and an unlock position;
   a rotatable cam shaft extending through said non-linear passage and engaging said lock bolt, said cam shaft having a first end and a second end, said first end defining a first longitudinal axis, and said second end defining a second longitudinal axis that intersects said first longitudinal axis, wherein upon rotation of said cam shaft, said cam shaft urges said lock bolt between said lock position and said unlock position; and
   a cam pin substantially parallel to said cam shaft, said cam pin being movable between a first longitudinal position in which said cam pin engages an ignition switch and second longitudinal position in which said cam pin does not engage said ignition switch.

2. The steering lock assembly as in claim 1, in which said cam shaft is an assembly including a forward shaft having a distal end rotatably coupled to a proximal end of a rearward cam shaft.

3. The steering lock assembly as in claim 2, in which said forward shaft distal end includes one of a socket and a ball coupled to the other of the socket and the ball formed on said rearward cam shaft proximal end to couple said forward shaft distal end to said proximal end of said rearward cam shaft.

4. The steering lock assembly as in claim 3, in which said ball has a polygonal cross section.

5. The steering lock assembly as in claim 1, in which said cam pin extends through a passageway formed in said cam shaft between said cam shaft first and second ends.

6. The steering lock assembly as in claim 1, in which said cam shaft is disposed in the housing.

7. A steering lock assembly comprising:
   a rotatable cam shaft defining a non-linear path between a first end and a second end, said cam shaft having a first end and a second end, said first end defining a first longitudinal axis, and said second end defining a second longitudinal axis that intersects said first longitudinal axis; and
   a cam pin disposed in said cam shaft along a non-linear portion of said non-linear path, and movable between a first position in which said cam pin engages an ignition switch and a second position along said non-linear path in which said cam pin does not engage said ignition switch.

8. The steering lock assembly as in claim 7, in which said rotatable cam shaft is disposed in a housing.

9. The steering lock assembly as in claim 7, in which said cam shaft is an assembly including a forward shaft having a distal end rotatably coupled to a proximal end of a rearward cam shaft.

10. The steering lock assembly as in claim 7, in which said cam pin extends through a passageway formed in said cam shaft between said cam shaft first and second ends.

11. The steering lock assembly as in claim 7, in which said cam pin is formed from a resilient material that bends at said intersection of said first and second longitudinal axes.

12. The steering lock assembly as in claim 7, including a lock bolt movable between a lock position and an unlock position, wherein upon rotation of said cam shaft, said lock bolt moves between said lock position and said unlock position.

13. A steering lock assembly comprising:
    a housing defining a non-linear passage;
    a lock bolt disposed in a cavity formed in said housing and intersecting said non-linear passage, said lock bolt being movable between a lock position and an unlock position;
    a rotatable cam shaft extending through said non-linear passage and engaging said lock bolt, said cam shaft having a first end and a second end, said first end defining a first longitudinal axis, and said second end defining a second longitudinal axis that intersects said first longitudinal axis, wherein upon rotation of said cam shaft, said lock bolt moves between said lock position and said unlock position; and
    a cam pin extending substantially parallel to said cam shaft and movable between a first longitudinal position in which said cam pin engages an ignition switch and a second longitudinal position in which said cam pin does not engage said ignition switch.

14. The steering lock assembly as in claim 13, in which said cam shaft is an assembly including a forward shaft having a distal end rotatably coupled to a proximal end of a rearward cam shaft.

15. The steering lock assembly as in claim 14, in which said forward shaft distal end includes one of a socket and a ball coupled to the other of the socket and the ball formed on said rearward cam shaft proximal end to rotatably couple said forward shaft distal end to said proximal end of said rearward cam shaft.

16. The steering lock assembly as in claim 15, in which said ball has a polygonal cross section.

17. The steering lock assembly as in claim 13, in which said cam pin extends through a passageway formed in said cam shaft between said cam shaft first and second ends.

18. The steering lock assembly as in claim 13, in which said cam shaft and cam pin are disposed in the housing.

* * * * *